United States Patent
Choi (10) Patent No.: US 8,416,447 B2
(45) Date of Patent: Apr. 9, 2013

(54) METHOD AND APPARATUS TO SET PRINT OPTIONS

(75) Inventor: Jun-young Choi, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 1044 days.

(21) Appl. No.: 11/437,694

(22) Filed: May 22, 2006

(65) Prior Publication Data

US 2006/0279759 A1 Dec. 14, 2006

(30) Foreign Application Priority Data

Jun. 13, 2005 (KR) .......... 10-2005-0050494

(51) Int. Cl.
*G06F 3/12* (2006.01)
*G06K 15/00* (2006.01)

(52) U.S. Cl.
USPC ....... 358/1.16; 358/1.13; 358/1.14; 358/1.15; 358/1.17; 358/1.18

(58) Field of Classification Search ........ 358/1.13–1.18; 707/3, 4, 7, 102, 103, 103 R, 205, 204, 203
See application file for complete search history.

(56) References Cited

U.S. PATENT DOCUMENTS

| | | | | |
|---|---|---|---|---|
| 5,434,974 | A * | 7/1995 | Loucks et al. ................ | 1/1 |
| 6,184,998 | B1 * | 2/2001 | Tebeka ................ | 358/1.15 |
| 6,362,892 | B1 * | 3/2002 | Lee et al. ................ | 358/1.13 |
| 6,513,073 | B1 * | 1/2003 | Kawai et al. ................ | 710/1 |
| 6,798,530 | B1 * | 9/2004 | Buckley et al. ................ | 358/1.13 |
| 6,940,614 | B2 * | 9/2005 | Subramaniam ................ | 358/1.13 |
| 6,941,523 | B1 * | 9/2005 | Mathieson ................ | 715/809 |
| 6,965,958 | B1 * | 11/2005 | Sugiyama ................ | 710/104 |
| 7,014,374 | B2 * | 3/2006 | Hamaguchi et al. ................ | 400/62 |
| 7,057,747 | B1 * | 6/2006 | Minagawa ................ | 358/1.13 |
| 7,075,670 | B1 * | 7/2006 | Koga ................ | 358/1.15 |
| 7,102,783 | B2 * | 9/2006 | Morooka et al. ................ | 358/1.15 |
| 7,145,688 | B2 * | 12/2006 | Minagawa ................ | 358/1.2 |
| 7,161,696 | B2 * | 1/2007 | Yamamoto et al. ................ | 358/1.15 |
| 7,190,467 | B2 * | 3/2007 | Simpson et al. ................ | 358/1.1 |

(Continued)

FOREIGN PATENT DOCUMENTS

| | | |
|---|---|---|
| EP | 0 933 693 A2 | 8/1999 |
| EP | 1 026 578 A2 | 8/2000 |

(Continued)

OTHER PUBLICATIONS

Peterson, Larry L., "The Profile Naming System", pp. 341-364 (Jun. 1988), Published in ACM Transactions on Computer Systems, vol. 6, No. 4, (Nov. 1988).*

(Continued)

*Primary Examiner* — Twyler Haskins
*Assistant Examiner* — Jonathan Beckley
(74) *Attorney, Agent, or Firm* — Stanzione & Kim, LLP (57) ABSTRACT

A method of setting print options of an image forming apparatus using a driver user interface in a terminal, such as a PC, connected to the image forming apparatus. The apparatus may include a user input unit to receive the print options, a name generating unit to automatically-generate setting names using the input print options a storage unit to store the input print options to correspond to the automatically-generated setting names, and a control unit to control the storage of the input print options and the generated setting names in the storage unit.

19 Claims, 5 Drawing Sheets

U.S. PATENT DOCUMENTS

| | | | |
|---|---|---|---|
| 7,209,250 B2 * | 4/2007 | Nakao | 358/1.15 |
| 7,298,513 B2 * | 11/2007 | Namikata | 358/1.15 |
| 7,307,745 B2 * | 12/2007 | Tanaka | 358/1.15 |
| 7,460,259 B2 * | 12/2008 | Kamei | 358/1.15 |
| 7,495,793 B2 * | 2/2009 | Kojima et al. | 358/1.16 |
| 7,743,162 B2 * | 6/2010 | Matsushima | 709/232 |
| 7,839,516 B2 * | 11/2010 | Tomita et al. | 358/1.15 |
| 7,876,462 B2 * | 1/2011 | Kadowaki | 358/1.15 |
| 2002/0049748 A1 * | 4/2002 | Iki et al. | 707/2 |
| 2003/0011801 A1 | 1/2003 | Simpson et al. | |
| 2003/0063305 A1 * | 4/2003 | McIntyre | 358/1.13 |
| 2003/0112456 A1 * | 6/2003 | Tomita et al. | 358/1.13 |
| 2003/0202010 A1 * | 10/2003 | Kerby et al. | 345/744 |
| 2004/0054983 A1 * | 3/2004 | Noguchi | 717/100 |
| 2004/0109175 A1 * | 6/2004 | Hatori et al. | 358/1.1 |
| 2004/0227973 A1 * | 11/2004 | Taylor | 358/1.15 |
| 2005/0195434 A1 * | 9/2005 | Ohara et al. | 358/1.16 |
| 2006/0087680 A1 * | 4/2006 | Maeda | 358/1.15 |

FOREIGN PATENT DOCUMENTS

| | | |
|---|---|---|
| JP | 08-69361 | 3/1996 |
| JP | 11-224174 | 8/1999 |
| JP | 2002-304282 | 10/2002 |
| JP | 2003-091389 | 3/2003 |
| JP | 2003-280841 | 10/2003 |

OTHER PUBLICATIONS

European Search Report dated Dec. 19, 2007 issued in EP 06115248.4.

Korean Office Action dated Sep. 20, 2006 issued in KR 2005-50494.

* cited by examiner

METHOD AND APPARATUS TO SET PRINT OPTIONS

CROSS-REFERENCE TO RELATED APPLICATIONS

This application claims the priority of Korean Patent Application No. 10-2005-0050494, filed on Jun. 13, 2005 in the Korean Intellectual Property Office, the disclosure of which is incorporated herein in its entirety by reference.

BACKGROUND OF THE INVENTION

1. Field of the Invention

The present general inventive concept relates to a method and apparatus to set print options of an image forming apparatus using a driver user interface in a terminal such as a PC connected to the image forming apparatus, and more particularly, to a method and apparatus to set print options which automatically generates setting names by including names and values of print options input by a user and stores the generated setting names together with the set print options.

2. Description of the Related Art

Generally, image forming apparatuses receive document data generated by a user using an application program installed in a PC and then output on, for example, print paper, so that the user can read the data. Various print options that are related to the function of the image forming apparatuses, such as paper size and printing resolution, can be set using a driver installed in the PC.

Print options that can be set in the driver are becoming more and more diversified due to recent developments in driver-related technologies. Accordingly, the user sets various print options and then creates and stores a certain setting name for the print options selected by the user (if needed). When the previously set print options are needed subsequently, print options can be retrieved by selecting the stored setting name without having to input again the previously set print options.

Figure 1:
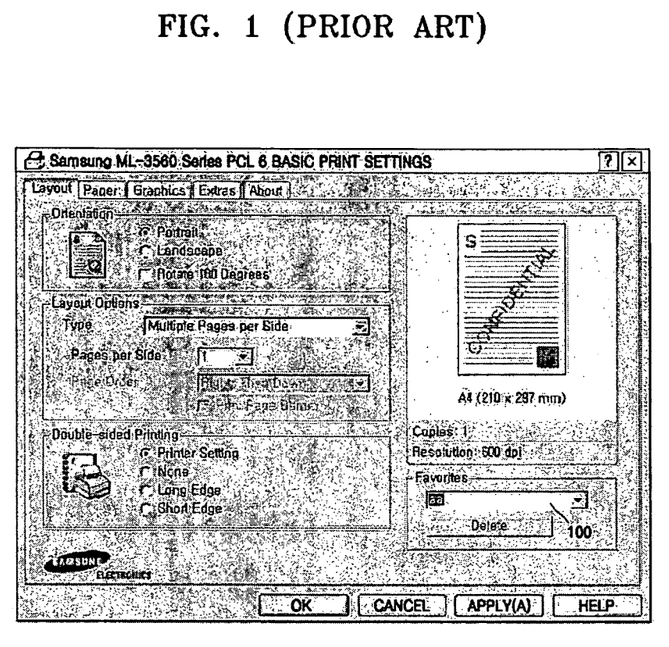
FIG. 1 illustrates a user interface to set print options according to a conventional method.

FIG. 1 is a view of a conventional driver user interface window to store a certain setting name after setting print options. The driver user interface window includes layout, paper, graphics, and extras tabs as print option categories. The user inputs print option values for the each of the print option values displayed in the user interface window after selecting one of the print option categories using, for example, a mouse. After all print options are input by the user, the user inputs a setting name of the input print options in a favorites region 100 and presses an apply (A) button. Then, the input print options are stored to correspond to the input setting name. Thereafter, the user can select a desired setting name among several stored setting names by searching the setting names listed in the favorites region 100. The user can then recall the stored print options of the selected setting name, and apply the print options to the printing.

When setting print options using the above-described conventional method, the user must manually input setting names that are to be stored whenever setting print options. In addition, the setting names often do not reveal the print options contained within unless they are named appropriately, that is, unless the user manually inputs a setting name that corresponds to the input print options.

SUMMARY OF THE INVENTION

The present general inventive concept provides a method and apparatus to set print options that automatically generates setting names through which set print options can be easily determinable. The automatically-generated setting names are stored together with the set print options when setting the print options of an image forming apparatus using a driver user interface.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a method of setting print options, the method including receiving input print options, and generating one or more setting names using the input print options.

The generating one or more setting names may include combining the input print option names and the print option values corresponding to the input print option names. The print option names and the print option values may be combined in a form set by a user.

The generating one or more setting names may include extracting print option names and the input print option values with respect to print options that have non-default print option values different from default values among the input print options, and generating a setting name by combining the extracted print option names and the extracted print option values.

The one or more setting names may be generated so that the input print options can be differentiated.

The method may further include searching a storage unit to determine whether second print options that are the same as the input print options are stored in the storage unit, and reading and displaying the one or more setting names corresponding to the input print options from the storage unit when the second print options that are the same as the input print options are determined to be stored in the storage unit.

The method may further include displaying the generated one or more setting names. The generated one or more setting names may be displayed in a drop down list or a tooltip.

The one or more setting names may be generated by combining the input print option names, print option values corresponding to the input print option names, and the print option categories.

The foregoing and/or other aspects and utilities of the present general inventive concept may also be achieved by providing an apparatus to set print options, the apparatus including a user input unit to receive input print options, a name generating unit to generate one or more setting names using the input print options, a storage unit to store the input print options to correspond to the generated one or more setting names, and a control unit to control the storage of the input print options and the generated one or more setting names in the storage unit.

The name generating unit may generate the one or more setting names by combining the input print option names and the print option values corresponding to the input print option names.

The name generating unit may include an option extractor to extract print option names and the print option values that have non-default print option values different from default values among the input print options, and a character combiner which generates setting names by combining the extracted print option names and the print option values.

The apparatus may further include a display unit to display the one or more setting names. The display unit may display the setting names using a drop down list or a tooltip.

The apparatus may further include a searching unit to search the storage unit to determine whether second print options that are the same as the input print options are stored in the storage unit, and a display unit to display one or more setting names stored in the storage unit that correspond to the input print options when the print options that are the same as the input print options are determined to be stored in the storage unit.

The name generating unit may generate the one or more setting names by combining the input print option names, the print option values corresponding to the input print option names, and print option categories.

The foregoing and/or other aspects and utilities of the present general inventive concept may also be achieved by providing a computer-readable recording medium including a program to execute a method in a host device, the method comprising receiving input print options, and generating one or more setting names using the input print options.

The foregoing and/or other aspects and utilities of the present general inventive concept may also be achieved by providing a method to automatically-generate a setting name, the method including receiving at least one input print option name and a non-default print option value corresponding to the print option name, and automatically-generating a setting name corresponding to the at least one input print option name and the non-default print option value.

The foregoing and/or other aspects and utilities of the present general inventive concept may also be achieved by providing a computer-readable recording medium comprising a program to automatically-generate a setting name, the program including instructions to receive at least one input print option name and a non-default print option value corresponding to the print option name, and instructions to automatically-generate a setting name corresponding to the at least one input print option name and the non-default print option value.

The foregoing and/or other aspects and utilities of the present general inventive concept may also be achieved by providing an apparatus to automatically generate a setting name, the apparatus including a user input unit to receive at least one input print option name and a non-default print option value corresponding to the print option name, and a name generating unit to automatically-generate a setting name corresponding to the at least one input print option name and the non-default print option value. The name generating unit may include an extracting unit to extract the at least one print option name and the non-default print option value from the user input unit, and a combining unit to automatically-generate the setting name by combining the at least one input print option name and the non-default print option value.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
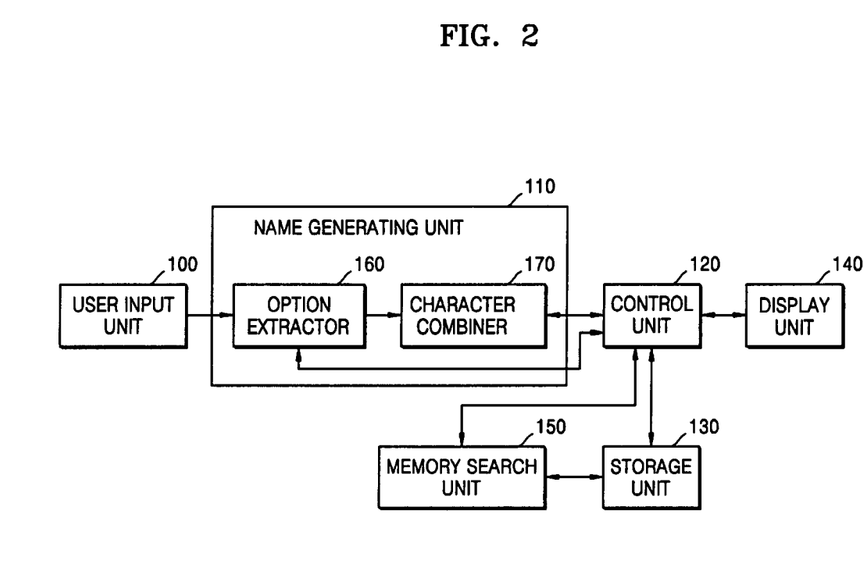
FIG. 2 is a block diagram illustrating an apparatus to set print options according to an embodiment of the present general inventive concept.

FIG. 2 is a block diagram illustrating an apparatus to set print options according to an embodiment of the present general inventive concept. The apparatus includes a user input unit 100, a name generating unit 110, a controlling unit 120, a storage unit 130, a display unit 140, and a memory searching unit 150. The operation of the apparatus will be described in more detail in combination with a flow chart illustrating a method of setting print options illustrated in FIG. 6.

The controlling unit 120 controls the entire operation of the apparatus. The user input unit 100 receives the print options input from a user (see operation 600 in FIG. 6). The input print options include, for example, print paper size, print paper lay-out, printing resolution, a toner save mode, and a double-sided printing mode. The name generating unit 110 automatically-generates a setting name corresponding to the input print options by combining print option names, e.g., print paper size, set by the user and input print option values corresponding to the print option names (e.g., the print paper size A4).

The name generating unit 110 may include an option extractor 160 and a character combiner 170. The option extractor 160 receives information on the print options input by the user from the user input unit 100, and extracts one or more print option names and corresponding print option value(s) of the input print option (see operation 610 in FIG. 6). The character combiner 170 combines the extracted one or more print option names and corresponding print option values to automatically-generate the setting name that represents the input print options. The term "print options" includes one or more of print option categories, print option names, and print option values.

For example, if the user selects a print resolution option, and inputs a value of "1200 dpi" regarding the print resolution option, the character combiner 170 may automatically-generate a setting name as "resolution(1200 dpi)." However, this is only one example regarding the automatic generation of the setting name, but the present general inventive concept is not limited thereto. A setting name can be generated by combining information regarding the various set print option names and input print option values corresponding to the various set print option names. For example, if the user selects a print resolution option and inputs a value of "1200 dpi," and selects a toner saver mode option and inputs a value of "on," and selects a watermark option and inputs "Confidential," the character combiner 170 may automatically-generate a setting name as "resolution(1200 dpi)_TonerSave(On)_Watermark (Confidential)." In addition, the combination of the option names and the option values can be set in a form selected by the user. In particular, although the setting name examples above are in the form "Print Option Name 1 (print option value 1)_Print Option Name 2(print option value 2), . . . ," the form of the setting name may be selected by the user. For example, the user may set the setting name to appear in a form such as "Print Option Name 1; Print Option Name 2; . . . _ Print Option Value 1; Print Option Value 2; . . . " Thus, the form in which the automatically-generated setting name is presented is not limited, and the user may therefore personally select how print option names and print option values are to be combined to generate the setting names.

Figure 6:
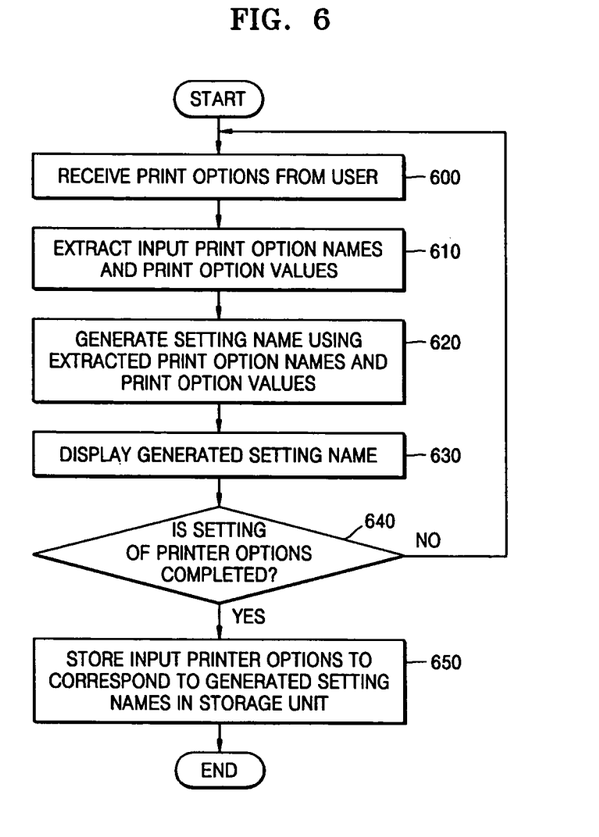
FIG. 6 is a flow chart illustrating a method to set print options according to an embodiment of the present general inventive concept.

The displaying unit 140 receives and displays the setting name generated by the name generating unit 110, which is output from the control unit 120 (see operation 630 in FIG. 6). The controlling unit 120 determines whether the user has completed inputting print options (see operation 640 in FIG. 6) and stores the print option names and the print option values in a corresponding generated setting name in the storage unit 130 when the inputting of the print options are complete (see operation 650). The storage unit 130 may be, for example, a ROM, RAM, or HDD. The controlling unit 120 may determine that the user has completed inputting the print options when, for example, the user presses an option store button (not shown) in the user input unit 100. When the inputting of the print options is not completed, operations 600 through 640 in FIG. 6 are repeated until the inputting of the print options is completed The apparatus may further include the memory searching unit 150. The memory searching unit 150 determines whether the print options the user has input are the same as print options stored in the storage unit 130. For example, if the user sets print options so that double-sided printing is performed on A4 sized print paper with a printing resolution of 1200 dpi, the memory searching unit 150 searches the storage unit 130 to determine whether a combination of the three options described above is stored therein. For example, the memory searching unit 150 may determine whether a setting name is stored in the storage unit 130 that is the same as the automatically-generated setting name corresponding to the user-input combination of print options. Even if the same combination of print options are input, a different setting name can be generated if an input order of the print options is different. Thus, if a setting name that corresponds to a combination of input print—in the same or different order—is searched in the storage unit 130, the setting name may be displayed.

Specifically, the memory searching unit 150 can search and locate a setting name in the storage 130 corresponding to the same combination of print options as the combination of print options input by a user, even when an order in which the print options are input by the user differs from an order in which the print options are saved in the setting name. For example, if the user selects a print resolution option and inputs a value of "1200 dpi," and then selects a toner saver mode option and inputs a value of "on," the memory searching unit 150 can locate all setting names that include a combination of these print option names and corresponding print option values, regardless of the fact that the user input the print resolution option first and the toner saver option second. In particular, the memory searching unit 150 can locate each of the setting names "resolution(1200 dpi)_TonerSave(On)" and "TonerSave(On)_resolution(1200 dpi)," as well as additional setting names having a form set by the user.

Figure 3:
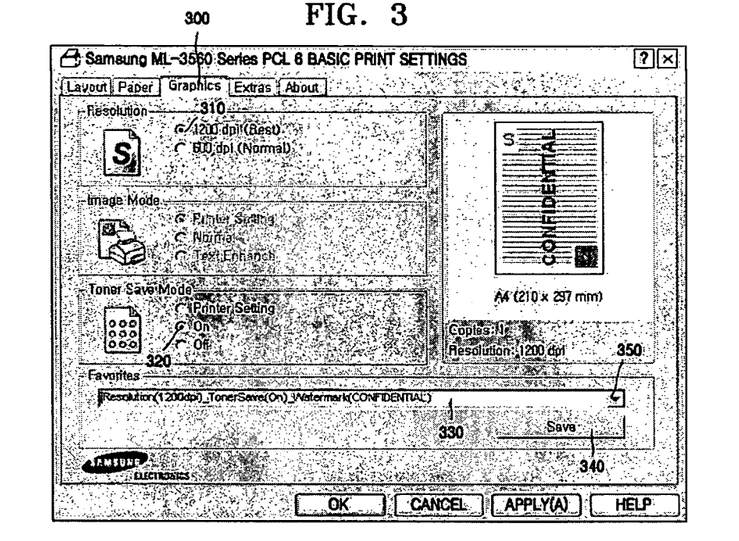
FIG. 3 illustrates a user interface to set print options according to an embodiment of the present general inventive concept.

FIG. 3 illustrates a user interface to set print options according to an embodiment of the present general inventive concept. Referring to FIG. 3, the method of inputting print options according to the embodiment described above, and a method of generating a setting name according to input print options, will be described in more detail. A user selects a print option category corresponding to a print option that the user wishes to select via the user input unit 100 (see FIG. 2) using, for example, a mouse. As illustrated in FIG. 3, a button 300 can be pressed to select a graphics tab (which is one of the print option categories to set print resolution related options), a radio button 310 can be pressed to set a resolution to 1200 dpi, a radio button 320 can be pressed to turn on the toner save mode, and a "confidential" watermark is set. If these print options are set, a setting name is automatically-generated by the name generating unit 110 (see FIG. 2) corresponding to the input print options, and is stored in a favorites region 330.

As illustrated in FIG. 3, print option names and corresponding print option values can be combined as "option name (option value)," with an underscore "_" separating a plurality of input print options, and a setting name can be automatically-generated by the name generating unit 110 (see FIG. 2). Therefore, the three print options that are input in FIG. 3 are displayed in a setting name of "Resolution(1200 dpi)_Toner (On)_Watermark(CONFIDENTIAL)" in the favorites region 330 in FIG. 3.

The name generating unit 110 (see FIG. 2) excludes print option names and/or print option values that are default values. For example, as illustrated in FIG. 3, when the input resolution value is set to/left at a default value of 600 dpi, the name generating unit 110 (see FIG. 2) does not include the resolution option and resolution value in the setting name that is automatically-generated and displayed in the favorites region 330. Thus, when the resolution is set to/left at 600 dpi, a radio button 320 is pressed to turn on the toner save mode, and a "confidential" watermark is set, the setting name that is automatically-generated by the name generating unit 110 (see FIG. 2) and displayed in the favorites region 330 may be "Toner(On)_Watermark(CONFIDENTIAL)." In other words, when a user selects default print option values for print option names, the default print option values, and corresponding print option names and print option categories, are excluded from the automatically-generated setting name.

If inputting of the print options and displaying of the corresponding automatically-generated setting name are completed, the user presses a save button 340 to store the input print options as the corresponding automatically-generated setting name.

If the user presses the button 350, setting names stored in the storage unit 130 are displayed. The user may apply print options previously stored using the method described above, and in particular, by selecting one of the displayed setting names corresponding to the desired print options.

Figure 4:
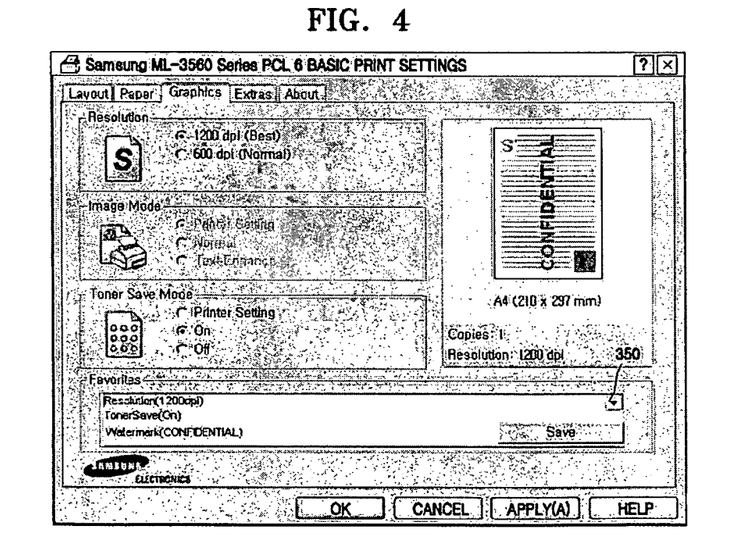
FIG. 4 illustrates a user interface to set print options according to another embodiment of the present general inventive concept.

FIG. 4 illustrates a user interface to set print options according to another embodiment of the present general inventive concept. Setting names automatically-generated corresponding to input print options can be displayed in a favorites region in a drop down list in two or more lines, as illustrated in FIG. 4. That is, when a user presses a button 350, the setting names corresponding to input print options may be displayed in two or more lines as illustrated in FIG. 4. The method of displaying setting names in a drop down list as described above may be selectively applied to cases in which the generated setting name cannot be displayed in a single line, in other words, may be selectively applied depending on the length of the generated setting name.

Figure 5:
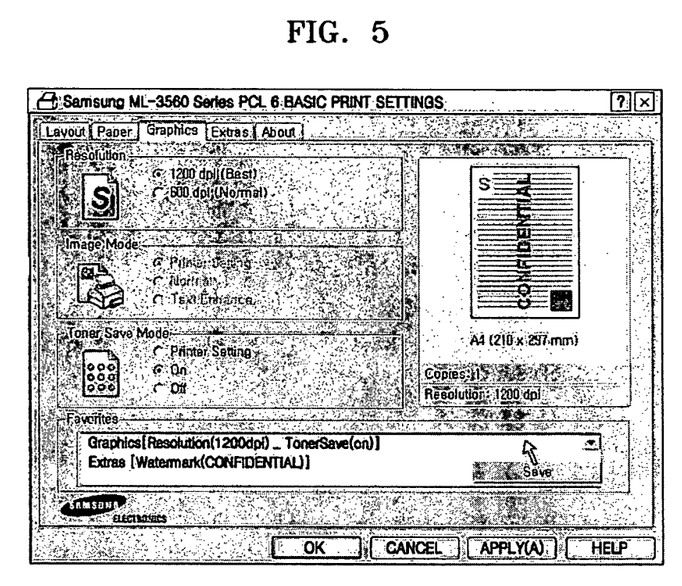
FIG. 5 illustrates a user interface to set print options according to another embodiment of the present general inventive concept.

FIG. 5 illustrates a user interface to set print options according to another embodiment of the present general inventive concept. A setting name automatically-generated corresponding to input print options can be displayed in a tooltip form, as illustrated in FIG. 5. That is, when a user locates a cursor over a favorites region as illustrated in FIG. 5, setting names corresponding to input print options may be displayed. When a user selects print options under two or more print option categories, the print option categories may be included in the automatically-generated setting name, together with the input print option name and corresponding print option values, as illustrated in FIG. 5. As discussed above, the form of the setting name, and in particular the order that the combination of the print option categories, print option names, and print option values appears, can be set by the user.

The method of setting print options of the image forming apparatus can be applied to any apparatuses connected to a PC, (for example, a scanner or a digital camera) in which print options of the apparatuses can be set using a driver user interface installed in the PC.

According to a method and apparatus to set print options in the present general inventive concept, print options of an image forming apparatus are set using a driver user interface and the set print options can be stored under a specific setting name that is automatically generated by including print option names and print option values input by a user, and the setting name is stored together with the set print options. Thus, the user does not have to input a new setting name every time the user sets print options, and print options can be conveniently selected by using the setting names that include the print option names and print option values.

The present general inventive concept can also be embodied as computer readable codes on a computer readable recording medium. The computer readable recording medium can be any data storage device that can store data that can be thereafter read by a computer system. Examples of the computer readable recording medium include, but are not limited to, read-only memory (ROM), random-access memory (RAM), CD-ROMs, magnetic tapes, floppy disks, optical data storage devices, and carrier waves (such as data transmission through the Internet).

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method to set print options using a print options setting apparatus, the method comprising:
   receiving print options input from a user at an apparatus;
   using the apparatus to generate print settings corresponding to the input print options; and
   generating one or more setting names for the input print options without receiving additional user input regarding the content of the one or more setting names, by combining the names of the input print options and corresponding values of the input print options.

2. The method of claim 1, further comprising storing the input print options in a storage unit of the apparatus using the generated setting names.

3. The method of claim 2, comprising:
   searching the storage unit to determine whether second print options that are the same as the input print options are stored in the storage unit; and
   reading and displaying the one or more setting names corresponding to the input print options from the storage unit when the second print options that are the same as the input print options are determined to be stored in the storage unit.

4. The method of claim 1, wherein the names of input print options and the values of print options are combined in a form previously set by a user.

5. The method of claim 1, wherein the generating of the one or more setting names comprises:
   extracting the names of input print options and the values of print options different from default values among the input print options; and
   combining the extracted names and the extracted non-default values of print options to generate the one or more setting names.

6. The method of claim 1, wherein the one or more setting names are generated so that the input print options can be differentiated.

7. The method of claim 1, further comprising displaying the generated one or more setting names using the apparatus.

8. The method of claim 7, wherein the generated one or more setting names are displayed in a drop down list or a tooltip.

9. The method of claim 1, wherein the generating of the one or more setting name comprises combining the names of the input print options, the values of print options corresponding to the names of input print options, and categories of the input print options, to generate the one or more setting names.

10. A non-transitory computer-readable recording medium having stored thereon a program to execute in a host device a method of setting print options, the method comprising:
    receiving with the host device print options input from a user; and
    generating with the host device and without additional user input regarding the content of the one or more setting names one or more setting names by combining the names of the input print options and corresponding values of the input print options.

11. An apparatus to set print options, the apparatus comprising:
    a user input unit to receive input print options; and
    a name generating unit to generate one or more setting names based on names and values of the input print options without additional user input regarding the setting name, by combining the names of the input print options and corresponding values of the input print options.

12. The apparatus of claim 11, further comprising:
    a storage unit to store the input print options, so as to correspond to the generated one or more setting names; and
    a control unit to control the storage of the input print options and the generated one or more setting names in the storage unit.

13. The apparatus of claim 12, further comprising:
    a searching unit to search the storage unit to determine whether print options that are the same as the input print options are stored in the storage unit; and
    a display unit to display one or more setting names stored in the storage unit that correspond to the input print options when the print options that are the same as the input print options are determined to be stored in the storage unit.

14. The apparatus of claim 11, wherein the names of the input print options and the corresponding values of print options are combined in a form set by a user.

15. The apparatus of claim 11, wherein the name generating unit comprises:
    an option extractor to extract the names of the input print options and non-default values of input print options; and a character combiner to generate the one or more setting names by combining the extracted names of input print options and the non-default values of input print options.

16. The apparatus of claim 11, further comprising a display unit to display the one or more setting names.

17. The apparatus of claim 16, wherein the display unit displays the one or more setting names using a drop down list or a tooltip.

18. The apparatus of claim 11, wherein the name generating unit generates the one or more setting names by combining the names of the input print options, the values of print options corresponding to the names of input print options, and categories of the input print options, to generate the one or more setting names.

19. A method to automatically generate a setting name using an apparatus to set print options, the method comprising:

receiving from a user of the apparatus an input print option and a non-default value of a print option corresponding to the input print option; and automatically generating with the apparatus a setting name corresponding to the input print option, without any additional user input regarding the content of the setting name, by combining the name of the input print option and the non-default value of the print option.

* * * * *